United States Patent [19]

Schoon

[11] Patent Number: 4,541,061
[45] Date of Patent: Sep. 10, 1985

[54] DATA CLOCKING CIRCUITRY FOR A SCANNING APPARATUS

[75] Inventor: David J. Schoon, North Branch, Minn.

[73] Assignee: Minnesota Mining and Manufacturing Company, St. Paul, Minn.

[21] Appl. No.: 434,189

[22] Filed: Oct. 13, 1982

[51] Int. Cl.³ .................... H04N 1/22; G06K 15/12
[52] U.S. Cl. .................................. 364/518; 364/519; 350/6.5; 350/6.8; 358/208; 346/108
[58] Field of Search .............. 358/208; 331/1 A; 346/109, 160, 108; 400/119; 364/519, 518, 521; 250/234; 350/6.8, 6.5; 307/106; 328/155

[56] References Cited

U.S. PATENT DOCUMENTS

| | | | |
|---|---|---|---|
| 4,142,210 | 2/1979 | Otohe et al. | 346/76 L |
| 4,307,346 | 12/1981 | Kurosawa et al. | 328/155 |
| 4,344,677 | 8/1982 | Stuermer et al. | 346/108 |
| 4,355,860 | 10/1982 | Lavallee et al. | 350/6.8 |
| 4,358,789 | 11/1982 | Confer | 358/208 |
| 4,386,271 | 5/1983 | Chiang et al. | 358/208 |
| 4,410,234 | 10/1983 | Mikami et al. | 350/332 |

*Primary Examiner*—Errol A. Krass
*Assistant Examiner*—Donna Angotti
*Attorney, Agent, or Firm*—Donald M. Sell; James A. Smith; Robert L. Marben

[57] ABSTRACT

Clocking circuitry for providing clocking signals in accordance with a preprogrammed sequence of rates. An addressable memory is included having data defining such rates with a voltage controlled oscillator (VCO) controlled via data from the addressable memory. An address producing means is controlled by the clocking signals of the VCO to provide an address signal for the memory in response to each clocking signal. The clocking circuitry is used with a moving mirror for a laser printer apparatus, the mirror having a known repetitive movement which is used in establishing the preprogrammed sequence of rates.

3 Claims, 3 Drawing Figures

DATA CLOCKING CIRCUITRY FOR A SCANNING APPARATUS

BACKGROUND OF THE INVENTION

The invention presented herein relates to clocking circuitry for providing clocking signals in accordance with a preprogrammed sequence of rates and, in particular, to such circuitry wherein the preprogrammed sequence of rates is based in part on the known repetitive movement of a mirror to which the output of a laser is directed.

Laser printers produce latent electrostatic images on a photoconductor by directing light from a laser to the photoconductor that has received a uniform electrical charge. The light from the laser is directed to the photoconductor in a scanning fashion with the laser turned on and off according to image defining data signals. It is important that the laser be controlled for on or off operation at the same point in one scan line as in the preceding scan line. If this action is not precisely controlled, images will appear irregular and portions of an image intended to present vertical lines will not be exactly vertical. Arrangements are used wherein light from the laser is directed to a moving mirror which reflects the light from the laser to the photoconductor to establish a scan line. The photoconductor is adapted for movement transverse to the scan lines so the light is directed to a different portion of the photoconductor for each scan line. A self resonant scanning mirror is a desirable device for providing a moving mirror for the scanning portion of a laser printer since its movement is highly reproducible from one line scan to the next due to its high "Q". "Q" is the ratio of energy stored in the mirror device over a time interval to the energy supplied to the mirror device during such time interval. The inherent stability of the self resonant scanning mirror can be utilized in a scanning system for a laser printer provided line-to-line synchronization of data signals provided to the laser is done precisely.

While the movement provided for the mirror of a resonant scanning mirror is highly reproducible, the velocity of movement is sinusoidal, which requires the clocking of image defining data signals for operation of the laser to be matched to the sinusoidal velocity of the mirror if there is to be uniform spacing of the image areas in a scan line. Prior approaches for providing a solution to this problem include the use of a second light beam plus a ruling or grating to generate clock signals. This is a cumbersome and expensive approach. Another approach, which also fails to provide the accuracy desired, uses the tachometer output of the scanning mirror to regulate the rate of clocking. Such an approach requires a solution to the inherent electrical noise component and microphonic noise component that is present in the tachometer output.

SUMMARY OF THE INVENTION

A new solution to the problem of providing clock signals at a rate that is matched to the varying velocity of a moving mirror is provided by the present invention. Clocking circuitry is provided which includes an addressable memory for storing data which defines a preprogrammed sequence of rates which are based in part on the known repetitive movement of a mirror. The circuitry also includes a voltage controlled oscillator (VCO) that is arranged for receiving signals based on data obtained from the addressable memory which determine the frequency of operation of the VCO. The output of the VCO provides clocking signals at the frequency of operation of the VCO. An address producing means which is connected to receive the clocking signals from the VCO is provided and serves to provide an address signal for each clocking signal received. The address producing means is connected to provide address signals to the addressable memory to obtain data from the addressable memory for control of the VCO.

Expanding on the foregoing aspects of the present invention, such aspects are usable in a control circuitry for producing sequential address signals in accordance with a preprogrammed sequence of rates which are based in part on the known repetitive movement of a mirror that occurs subsequent to the production of a start signal indicative of the mirror reaching a predetermined point in its movement and continuing until an end signal is produced that is indicative of the mirror reaching another predetermined point in its movement. Such control circuitry is provided by the clocking circuitry of the present invention wherein the address producing means has a reset input and the VCO has an inhibit input.

An electronic switching circuitry is provided which is connected to the inhibit input of the VCO and to the reset input of the address producing means. The electronic switching circuitry has two inputs, one for receiving the start signal and the other for receiving the end signal. The electronic switching circuitry provides a signal in response to the receipt of an end signal which is applied as an inhibit signal to the inhibit input of the VCO and as a reset signal for the address producing means. This signal is terminated when a start signal is received by the electronic switching circuitry.

BRIEF DESCRIPTION OF THE DRAWINGS

A better understanding of this invention, including its novel features and advantages, will be obtained upon consideration of the following detailed description and accompanying drawings wherein.

DETAILED DESCRIPTION

Figure 1:
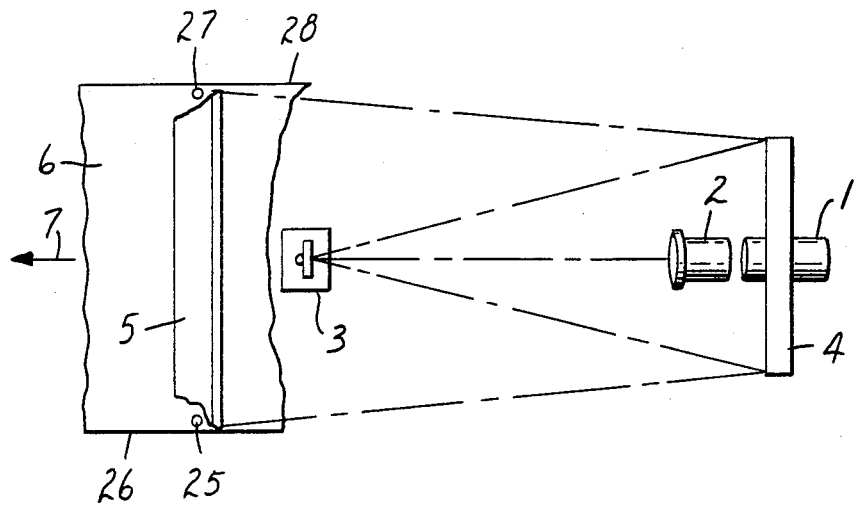
FIG. 1 is a plan view in schematic form illustrating the scanning portion of a laser printer apparatus.
Figure 2:
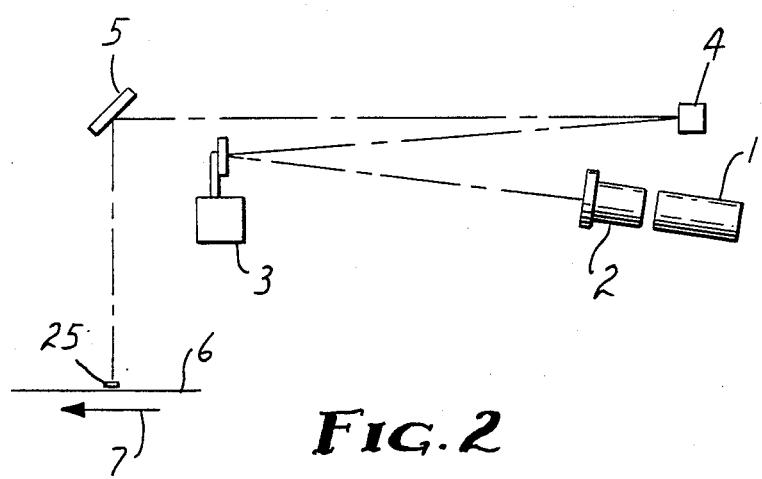
FIG. 2 is a side view of the scanning portion of a laser printer apparatus shown in FIG. 1.

Referring to FIG. 1 of the drawings, a plan view is shown illustrating the scanning portion of a laser printer which includes a laser 1, which can be a laser diode type, a lens system 2, a self resonant scanning mirror 3, mirrors 4 and 5 and a photoconductor element 6. Such elements are also shown in FIG. 2, which is a side view of the apparatus of FIG. 1. The photoconductor 6 is only partially shown. It is understood, however, that it can take the form of a belt, drum or flexible sheet.

Light from the laser 1 is focused by the lens system 2 onto the resonant scanning mirror 3 which oscillates to direct the light to mirror 4 causing the light to move as a scan lengthwise of mirror 4. The light presented to mirror 4 is reflected to mirror 5 which is positioned to direct such light to the photoconductor 6 to provide a line scan at the photoconductor 6. The photoconductor 6 is moved transversely of the light scan that is provided so a line-by-line scan is provided at the photoconductor 6. Movement of the photoconductor 6 is indicated by the arrow 7.

The apparatus of FIGS. 1 and 2 requires the laser 1 to be controlled for potential on or off operation at the same point in one scan line as in the preceding scan line. Failure to precisely control this action will cause the image produced at the photoconductor to present an irregular appearance and portions of an image intended to present vertical lines will not be exactly vertical. The solution to this problem is solved in part by the use of the resonant scanning mirror 3 since its movement is highly reproducible from one line scan to the next due to its high "Q". The velocity of the movement of the scanning mirror 3, however, is sinusoidal so the scan at each end portion of a scan line is carried out at a velocity that is less than the velocity during the center portion of a scan. The supply of image defining data signals to the laser 1, which determine the on-off condition for the laser, must be matched to the sinusoidal velocity of the scanning mirror 3 so that the on-off control of the laser 1 and, therefore, the image areas, are uniformly spaced in a scan line. Clocking signal circuitry, as shown in FIG. 3, is provided by the present invention making it possible to provide the image defining data signals for on-off control of the laser 1 in the desired manner indicated above.

Figure 3:
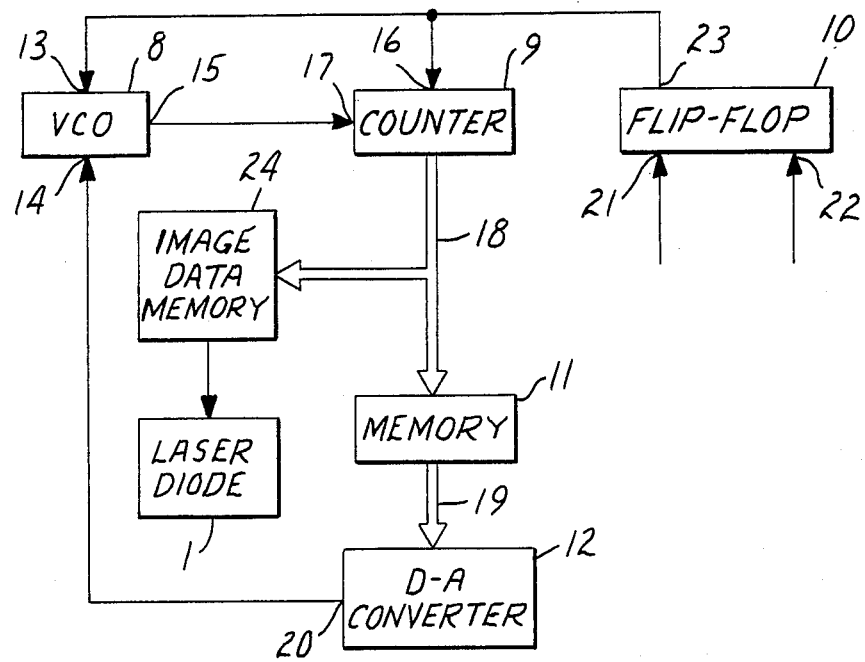
FIG. 3 is an electrical block diagram of clocking circuitry embodying the invention which is usable with the scanning portion of a laser printer as illustrated in FIGS. 1 and 2.

The clocking circuitry of FIG. 3 includes a voltage controlled oscillator 8, an address producing means, shown as a counter 9, an electronic switching circuit, shown as a flip-flop circuit 10, an addressable memory 11 and a signal converter means, shown as a digital-to-analog converter 12.

The voltage controlled oscillator (VCO) 8 includes an on-off of inhibit input 13 which is utilized to cause the VCO to operate from the time the light from the laser 1 is brought to the start of a scan position until it reaches the end of a scan position. The VCO 8 also has a signal control input 14 for receiving voltage signals for control of the frequency of operation of the VCO. The VCO 8 provides clocking signals at an output 15 at a frequency controlled by the signal input at 14.

The counter 9 functions as an address producing means and includes a reset input 16 which is utilized to reset the counter. The counter remains reset until the light from the laser 1 is brought to the start of a scan position. A clock input 17 of counter 9 is connected to the clock signal output 15 of VCO 8. The output of counter 9 connects with address lines 18 to supply a new address signal each time a clock signal is received by the counter 9 from VCO 8.

Memory 11 is an addressable memory in which data is stored which defines a preprogrammed sequence of rates which are determined in part by the velocity of operation of the resonant scanning mirror 3 as reflected by its operating frequency and amplitude; the time when a scan line is started; the transfer characteristics of the VCO 8; and the pitch for the print characters to be imaged on the photoconductor 6. The memory 11 is connected to the counter 9 via the address lines 18 causing the stored preprogrammed rates in memory 11 to be sequentially presented on the output lines 19 from memory 11.

Since the output from memory 11 is digital in form, the output from memory 11 on lines 19 is applied to the input of a signal converter means, which in FIG. 3 is provided by a digital-to-analog (D/A) converter 12. The output 20 of D/A converter 12 is connected to the signal control input 14 of VCO 8 serving to provide voltage signals at various levels in accordance with the program stored in memory 11. Typically, the stored program in memory 11 establishes a rate of operation for the VCO 8 which, in accordance with the sinusoidal movement of the scanning mirror 3, which typically increases from the start of a scan line, peaking at the center of a scan line and then decreasing as the end of the scan line is approached.

An electronic switching circuit, shown as flip-flop circuit 10 in FIG. 3, has two inputs 21, 22 and an output 23. The output 23 is connected to the inhibit input 13 of the VCO 8 and the reset input 16 of counter 9. The input 22 is the set input of the flip-flop 10 and is connected to receive a start of scan signal, i.e., a signal provided when the light from laser 1 is brought to the start of a scan position, which serves to set the flip-flop 10. Setting of the flip-flop 10 removes a signal from the output 23 that is effective to inhibit the operation of the VCO 8 and reset the counter 9 replacing it with a signal which permits operation of the VCO 8 and counter 9. The input 21 is the reset input for the flip-flop 10 and is connected to receive an end of scan signal, i.e., a signal provided when light from laser 1 is brought to the end of a scan position. Receipt of an end of scan signal by the flip-flop 10 causes the flip-flop to be reset to provide a signal at the output 23 that is effective to reset counter 9 and inhibit operation of the VCO 8. No further clocking signals are produced until the inhibit signal from the output 23 of the flip-flop 10 is removed.

In addition to providing address signals to the memory 11, the address signals on lines 18 from counter 9 are also used to obtain image defining data signals that establish an on-off condition for the laser 1 each time a clock signal is produced by the VCO 8. Such use of the address signals from counter 9 is shown by the connection of address lines 18 to an image data memory 24 which has its output shown applied to the laser diode 1.

The manner in which the end of scan line signal and start of scan line signal are provided is not important except to the extent that the latter signal must be provided at the same point for each scan line. One convenient way for providing the start of scan line signal and the end of scan line signal is illustrated in FIG. 1. A light-to-electric transducer 25 is positioned just above and about 1.3 centimeters inside the start of line scan edge 26 of the photoconductor 6 and in line with the scan line so as to receive light from laser 1 via mirror 5 when light from laser 1 is provided as the scanning mirror 3 begins a writing or scanning movement. When light is thus provided to the light-to-electric transducer 25, a start of scan signal is produced. Similarly, a light-to-electric transducer 27 is positioned just above the photoconductor 6 and about 1.3 centimeters inside the end of line scan edge 28 of the photoconductor 6 and in line with the scan line so as to receive light from laser 1 via mirror 5 when light from laser 1 is provided as the scanning mirror 3 nears the end of a writing or scanning movement. When light is thus provided to the transducer 27, an end of scan line signal is produced. Return movement of the scanning mirror is not used as a writing or scanning movement so the laser 1 is arranged to be held off during such return movement by suitable circuitry (not shown). The light-to-electric transducers 25 and 27 can be photodetector devices which are readily available. A small photodetector is used, which with the sharp light beam from the laser 1, causes the end scan line and start of scan line signals to precisely occur at the same point in one scan line to the next.

The particulars of the foregoing description are provided merely for purposes of illustration and are subject to a considerable latitude of modification without departing from the novel teachings disclosed therein. For example, while a laser is mentioned as a source of light, the invention is usable with any light source that can be modulated. Accordingly, the scope of this invention is intended to be limited only as defined in the appended claims, which should be accorded a breadth of interpretation consistent with this specification.

What is claimed is:

1. Clocking circuitry for providing clocking signals in accordance with a preprogrammed sequence of rates including:
   an addressable memory for storing data which defines the preprogrammed sequence of rates;
   a voltage controlled oscillator for receiving signals based on data obtained from said addressable memory for determining the frequency of operation of said voltage controlled oscillator, said voltage controlled oscillator having an output providing clocking signals at the frequency of operation of said voltage controlled oscillator; and
   address producing means connected to said output of said voltage controlled oscillator for providing an address signal for each clocking signal provided by said voltage controlled oscillator, said address producing means connected to said addressable memory to address said addressable memory by said address signals for obtaining data from said addressable memory for control of said voltage controlled oscillator.

2. Control circuitry used in relationship with a moving mirror with known repetitive movement for producing sequential address signals in accordance with a preprogrammed sequence of rates which are based in part on the known repetitive movement of the mirror that occurs subsequent to the production of a start signal indicative of the mirror reaching a predetermined point in its movement and continuing until an end signal is produced including:
   an addressable memory for storing data which defines the preprogrammed sequence of rates;
   a voltage controlled oscillator for receiving signals based on data obtained from said addressable memory for determining the frequency of operation of said voltage controlled oscillator and having an inhibiting signal input and clock signal output;
   address producing means connected to said clock signal output of said voltage controlled oscillator for providing an address signal for each clock signal provided by said voltage controlled oscillator, said address producing means connected to said addressable memory to address said addressable memory by said address signals for obtaining data from said addressable memory for control of said voltage controlled oscillator, said address producing means having a reset input; and
   an electronic switching circuit connected to said inhibiting signal input of said voltage controlled oscillator and to said reset input of said address producing means, said electronic switching circuit having one input for receiving the start signal, and a second input for receiving the end signal, said electronic switching circuit providing an inhibiting and resetting signal in response to the receipt of an end signal for inhibiting the operation of said voltage controlled oscillator and said address producing means, said electronic switching circuit terminating said inhibiting and resetting signal in response to the receipt of a start signal.

3. Clocking circuitry for a laser printer apparatus wherein the laser printer apparatus includes a laser, a resonant scanning mirror providing a known repetitive movement to which light from the laser is directed for further transmission to a photoconductor and a data memory, in which image defining data signals are stored, the data memory being addressed to provide the stored data signals for control of the laser, said clocking circuitry including:
   an addressable memory for storing data which defines the preprogrammed sequence of rates based in part on the known repetitive movement of the resonant scanning mirror;
   a voltage controlled oscillator for receiving signals based on data obtained from said addressable memory for determining the frequency of operation of said voltage controlled oscillator, said voltage controlled oscillator having an output providing clocking signals at the frequency of operation of said voltage controlled oscillator; and
   address producing means connected to said output of said voltage controlled oscillator for providing an address signal for each clocking signal provided by said voltage controlled oscillator, said address producing means operatively connected to said addressable memory to address said addressable memory by said address signals for obtaining data from said addressable memory for control of said voltage controlled oscillator, said address producing means connected to the data memory in which image defining data signals are stored to address the data memory by said address signals.

* * * * *